C. GUISE.
FIShing BAIT.
APPLICATION FILED JULY 13, 1915.

1,197,820.

Patented Sept. 12, 1916.

WITNESSES.
N. R. Tyndall.
E. P. Hall.

INVENTOR.
C. Guise.
BY J. Edward Maybee.
ATTY.

UNITED STATES PATENT OFFICE.

CLIFFORD GUISE, OF TORONTO, ONTARIO, CANADA, ASSIGNOR OF ONE-HALF TO HERBERT STONE, OF TODMORDEN POST OFFICE, ONTARIO, CANADA.

FISHING-BAIT.

1,197,820.  Specification of Letters Patent.  Patented Sept. 12, 1916.

Application filed July 13, 1915. Serial No. 39,654.

*To all whom it may concern:*

Be it known that I, CLIFFORD GUISE, of the city of Toronto, in the county of York, Province of Ontario, Canada, have invented certain new and useful Improvements in Fishing-Bait, of which the following is a specification.

This invention relates to artificial baits such as used in trolling or spinning, and my object is to devise a bait which may be used in weedy waters without danger of its becoming caught in the weeds.

I attain my object by forming the body of the bait without projections on which weeds could catch, and by arranging the hooks so that normally the points are protected by the bait but are adapted to be released to occupy an operative position by a sharp pull on the bait, substantially as hereinafter more specifically described and illustrated in the accompanying drawings in which—

Figure 1:
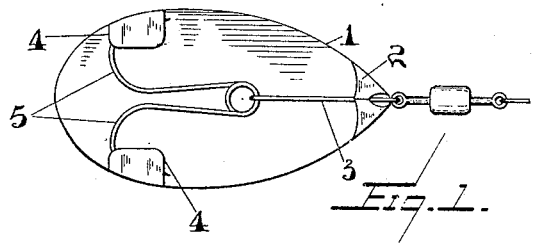
Figure 2:
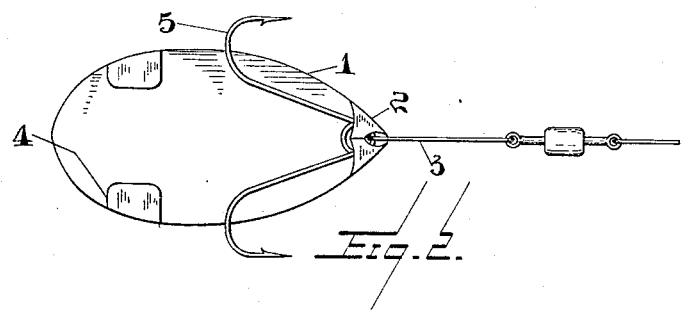
Figure 3:
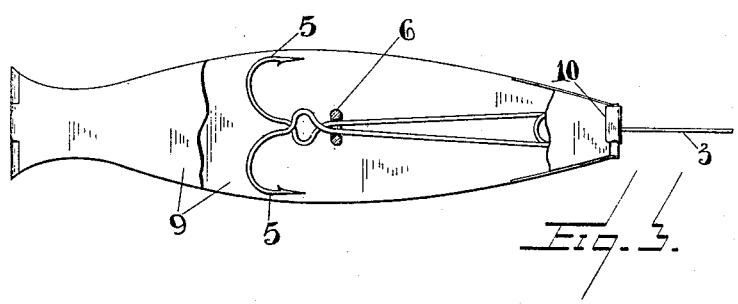

Figure 1 is a plan view of a simple form of my improved bait in normal position; Fig. 2 a similar view showing the bait with the hooks in operative position; Fig. 3 a similar view of a modification with the hooks in a protected position; and Fig. 4 a similar view of another modification with the hooks in their operative position.

In the drawings like numerals of reference indicate corresponding parts in the different figures.

Referring particularly to Fig. 1, 1 is the body of an ordinary spoon bait. The forward end of this is shaped to form a conical tubular guide for the leader 3. This end 2 will pass readily through any weeds without catching. Toward the rear end of the body inwardly turned lips 4 are formed. These form a frictional restraining device adapted normally to hold the hooks in their normal protected position. In this form of bait, a pair of hooks 5 are formed integral with one another, their shanks being connected by a spring coil integral therewith. The spring of the hooks is so set that they tend to expand laterally to operative position, but are restrained by their engagement with the lips 4. As the engagement, however, is purely frictional a longitudinal pull tending to move the hooks forwardly relative to the spoon will disengage them and allow them to spring outwardly to the position shown in Fig. 2. The hooks, it will be seen, are connected with the leader 3 which passes freely through the end 2 of the body. A strong enough pull on the body while the leader is held by the fisherman will release the hooks.

In Fig. 3 the hooks are shown directly connected to the leader, and the frictional restraint is provided by the eye 6 secured to the body of the bait. The shanks of the hooks are so shaped that when the loops therein are alined with the eye the hooks are in operative position, and when the shanks of the hooks are pressed rearwardly the points are retracted.

Figure 4:
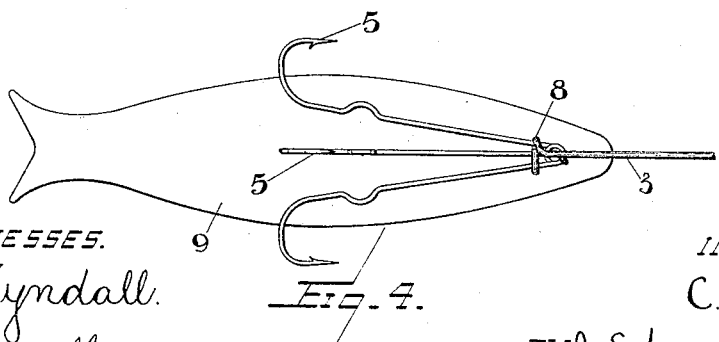

In Fig. 4 a modification is shown in which at least three hooks are employed secured to the body of the bait. The leader 3 has an eye 8 formed thereon, which by slipping up and down the shanks of the hooks retracts the same or allows them to fly out by their natural resiliency to their operative position. Many other modifications might be devised which would answer the purpose of my invention.

In forms such as shown in Figs. 3 and 4, the body of the bait may be of fish shape form formed in halves 9 hinged together at one end, the other end of one of the parts being adapted to spring beneath the lip 10 on the opposed part to retain the parts in the position they assume when the bait is being used. The halves may be easily opened out for the purpose of replacing the broken hooks or other damaged parts.

What I claim as my invention is:—

1. In an artificial bait the combination of a concavo-convex spoon body of oval form having integral inwardly turned lips formed at each side forward of the rear end close to the greatest transverse diameter of the oval but behind the same and provided with a guide for a leader at its forward end; a pair of hooks having their stems integral and a coil formed at the point where their stems adjoin, said hooks being adapted to be engaged under said lips; and a leader connected to said coil and passing through the aforesaid guide, the guide and leader being adapted to permit of the spoon sliding freely on the leader and swinging free of the hooks when the latter are disengaged from the aforesaid lips.

2. In an artificial bait the combination of a concavo-convex spoon body of oval form having integral inwardly turned lips formed at each side forward of the rear end close to the greatest transverse diameter of the oval but behind the same and provided with a guide for a leader at its forward end formed integral with the spoon; a pair of hooks having their stems integral and a coil formed at the point where their stems adjoin, said hooks being adapted to be engaged under said lips; and a leader connected to said coil and passing through the aforesaid guide, the guide and leader being adapted to permit of the spoon sliding freely on the leader and swinging free of the hooks when the latter are disengaged from the aforesaid lips.

Signed at Toronto, Canada, this 9th day of July, 1915, in the presence of the two undersigned witnesses.

CLIFFORD GUISE.

Witnesses:
J. EDW. MAYBEE,
E. P. HALL.

Copies of this patent may be obtained for five cents each, by addressing the "Commissioner of Patents. Washington, D. C."